Figure 3:
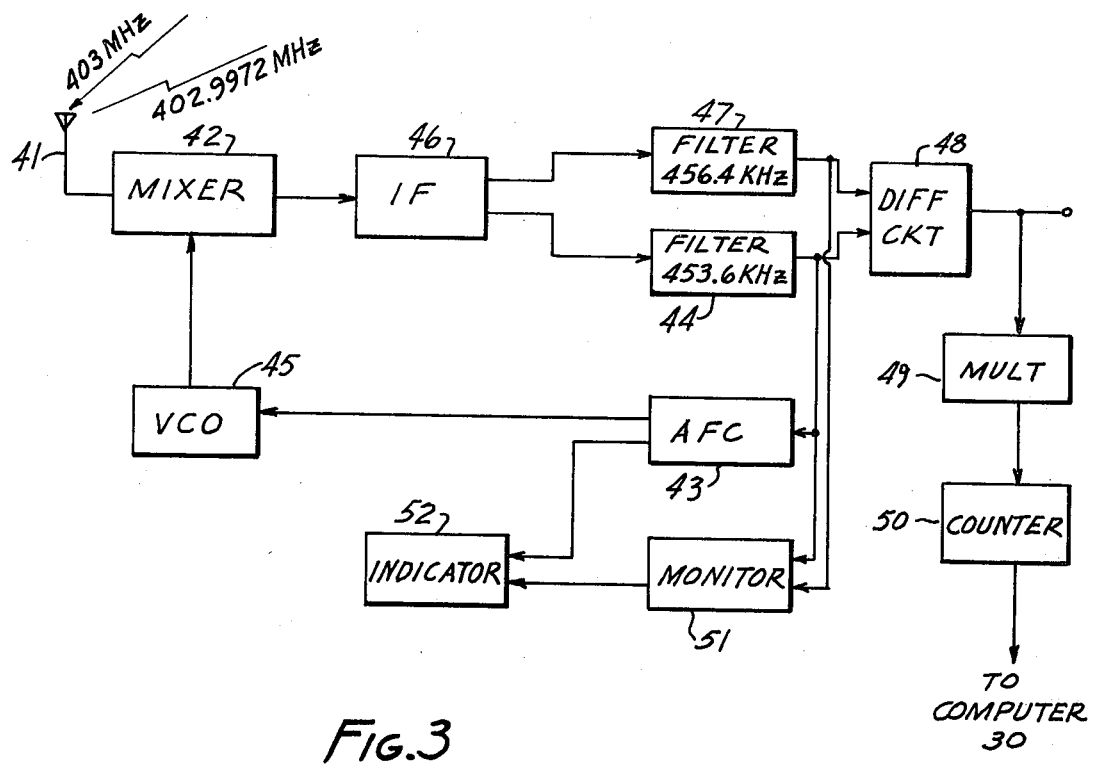

United States Patent [19]

Ulstad

[11] 3,995,273

[45] Nov. 30, 1976

[54] RADIO POSITION DETERMINING APPARATUS

[75] Inventor: Meredith S. Ulstad, Edina, Minn.

[73] Assignee: Control Data Corporation, Minneapolis, Minn.

[22] Filed: Apr. 30, 1975

[21] Appl. No.: 572,997

[52] U.S. Cl. .......................................... 343/112 R
[51] Int. Cl.² .......................................... G01S 5/06
[58] Field of Search ............................ 343/112 R

[56] References Cited
UNITED STATES PATENTS

| | | | |
|---|---|---|---|
| 1,562,485 | 11/1925 | Affel | 343/105 R |
| 3,060,426 | 10/1962 | Williams | 343/112 R |
| 3,757,340 | 9/1973 | Rogoff | 343/112 R |

Primary Examiner—Maynard R. Wilbur
Assistant Examiner—Richard E. Berger
Attorney, Agent, or Firm—Robert M. Angus

[57] ABSTRACT

Apparatus is provided to determine the relative shift of position of a vehicle carrying a transmitter transmitting at a predetermined frequency. A plurality of receivers are positioned to receive the signal transmitted, and each includes a counter for advancing a count representative of the number of cycles of signal received. A computer receives the counts from the receiver to determine the relative shift of vehicle position. Preferably, a reference transmitter is provided for transmitting a reference signal of predetermined frequency, which, when processed with the signal received from the vehicle, provides a difference or "beat" frequency which provides the basis for cycle counting at a reduced rate.

6 Claims, 4 Drawing Figures

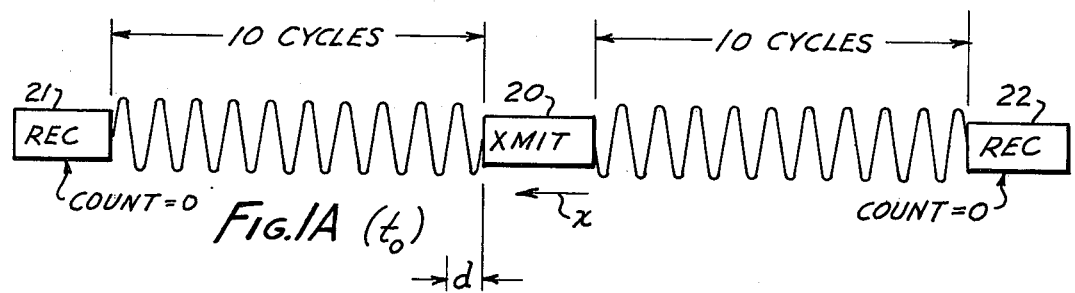
FIG.1A ($t_0$)
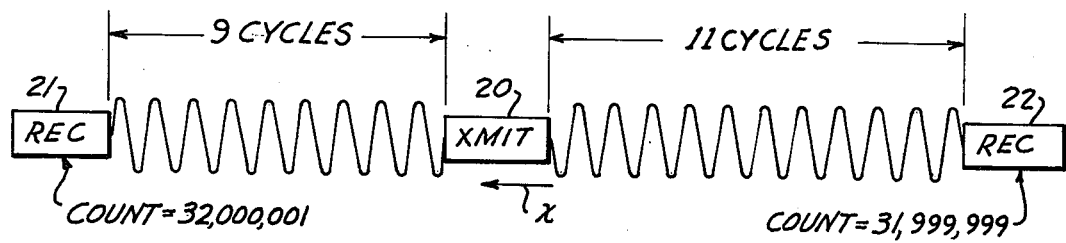
FIG.1B ($t_0 + 32 \times 10^6 \lambda$)
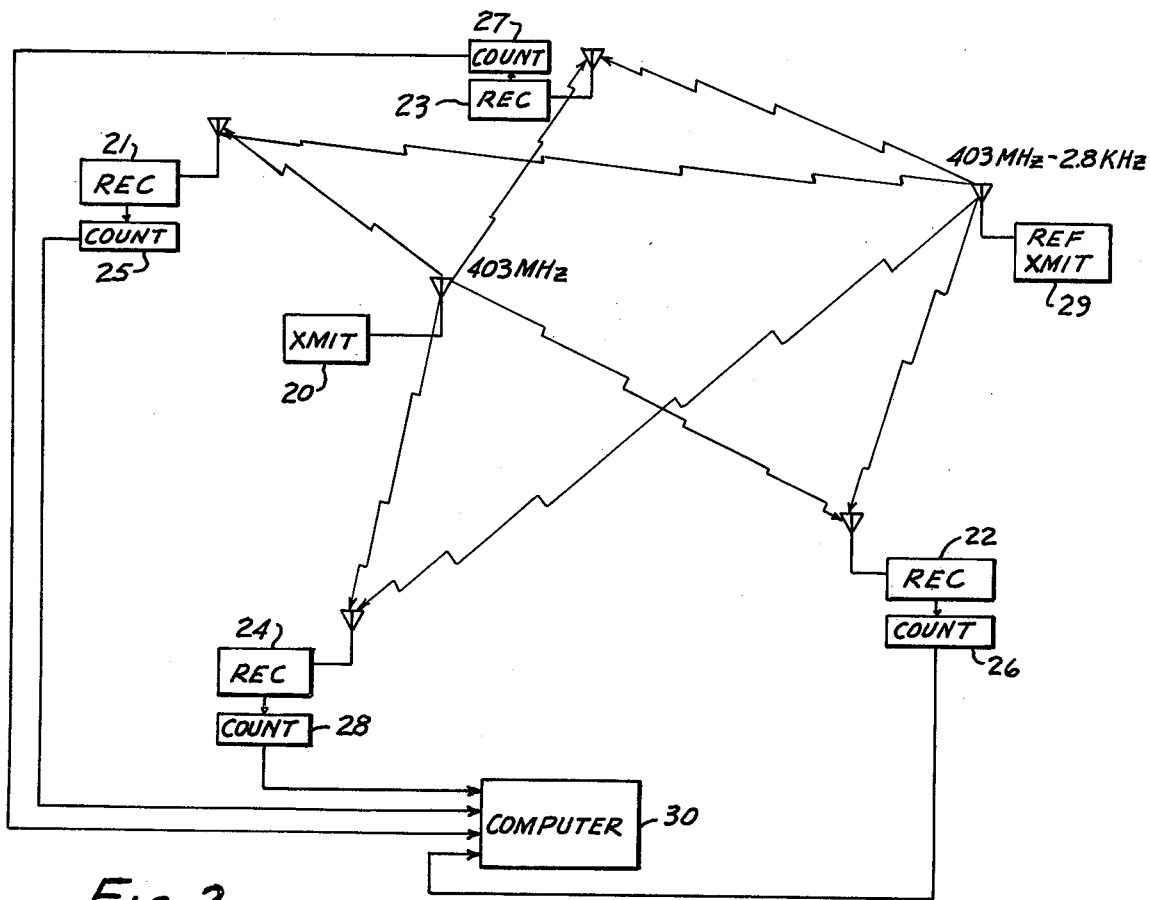
FIG.2

3,995,273

RADIO POSITION DETERMINING APPARATUS

This invention relates to navigation techniques, and particularly to apparatus and methods for tracking airborne vehicles. The invention is particularly applicable to tracking of weather balloons for meteorological surveys.

At present, there are basically three types of radio navigation and position locating techniques for locating the position of airborne and extraterrestrial vehicles. One class of such techniques contemplates detection of the doppler shift of the frequency of a signal transmitted by the moving vehicle. Utilizing the doppler frequency shift technique, the position of the vehicle moving along an axis may be determined by measuring the doppler shift at each of a plurality of fixed-location receivers and comparing the frequencies. As long as the vehicle travels along a single axis, the velocity of the vehicle may be determined, and hence its position, if the position is known at some preestablished point. An example of such doppler techniques may be found in U.S. Pat. No. 2,063,034 to Cafarelli. In the event that the frequency of transmission from the moving vehicle is inconvenient for doppler shift measurement, a stationary reference transmitter of known frequency may be utilized so as to establish a modulation, or "beat", frequency with the doppler shifted vehicle frequency so that doppler shift will occur on the frequency difference. An exmple of this refinement may be found in U.S. Pat. No. 3,757,340 to Rogoff.

A second technique utilizes the phase shift of a signal transmitted at a known frequency from a moving vehicle along an unknown path. Utilizing this technique, the phase shift between successive cycles of the signal received at a known position may be utilized to detect movement of the vehicle along any path. By properly positioning the receivers at specific position, lane changes can be detected and the absolute position of the vehicle may be determined. Such a technique is described in the U.S. Pat. No. 2,608,685 to Hastings. A third, well known technique, involves ordinary radar techniques wherein a transmitter emits a radar signal which is reflected off the vehicle and received by a receiver in such a manner that the time difference between the transmission and reception is utilized to locate the distance of the vehicle from the receiver. Quite obviously, radar techniques are quite distinct from the first two techniques in that the transmitter and receiver are both at a fixed location and are not carried by the moving vehicle.

The present invention is directed to yet another technique for radio navigation and position location and is particularly adaptable for use in meteorological surveys. In accordance with the present invention, a transmitter of known frequency is carried aboard a vehicle, such as a weather balloon following wind direction, and the signal from such transmitter is received by a plurality of receivers at fixed locations. The receivers each include counters to count the number of cycles of the signal received, and count differences between the various receivers are utilized to detect differential movement of the vehicle.

The present invention is particularly advantageous in that the position of the vehicle may be accurately determined to within a few, or even fraction of the wavelength of the signal transmitted by the vehicle, and hence, to within a few feet or inches in space over a distance of many miles.

It is an object of the present invention to provide apparatus for navigation and position finding purposes capable of accurately determining the position of a moving vehicle in space which is more accurate and more highly reliable than techniques previously known.

It is another object of the present invention to provide navigation and position finding apparatus which requires no moving parts (such as steerable antennas) so that the resulting apparatus is simple and light weight.

It is another object of the present invention to provide a technique for navigation and position locating purposes operating on the basis of counting the cycles of a transmitted signal.

According to the present invention, a signal of predetermined frequency is transmitted from a moving vehicle and is received by a plurality of receivers. Each receiver counts the number of cycles so received, and as the vehicle moves (and continuously transmits the signal frequency), each receiver continuously increases its count. As the vehicle moves, the number of wavelengths in transmission between the transmitter and each receiver is altered. Thus, the count rates at each receiver will differ, thereby resulting in a relative change in the number of cycles of the signal received by each receiver. The resultant count differences are processed to determine the change of position of the vehicle. If the position of the vehicle at some prior point is known (such as the point of release of a balloon carrying the transmitter or point of takeoff of an aircraft or space vehicle), the vehicle may be accurately tracked in space with a high degree of accuracy by determining its differential change in position in space.

One feature of the present invention resides in the provision of a reference transmitter for generation of a second signal for reception by each receiver to "beat" against the vehicle transmitted signal so that the count rate at each receiver is dependent upon the lower difference, or beat frequency.

The above and other features of this invention will be more fully understood from the following detailed description and the accompanying drawings, in which:

FIGS. 1A and 1B, taken together, illustrate the principles of navigation and position locating in accordance with the presently preferred embodiment of the present invention;

FIG. 2 is a plan view of a typical system configuration for position locating in accordance with the present invention; and FIG. 3 is a block circuit diagram of portions of the system in accordance with the present invention.

Referring to FIGS. 1A and 1B there is illustrated a simplified example of the principles of operation of the present invention. As shown in FIGS. 1A and 1B, transmitter 20 is moving in a direction indicated by arrow $x$ toward receiver 21 and away from receiver 22. Transmitter 20 is transmitting at a frequency having a known wavelength $\lambda$. The condition illustrated in FIG. 1A is at time $t_o$ and it shall be assumed that the counts in receivers 21 and 22 are both set to zero. The condition illustrated in FIG. 1B is at 32 million cycles later (the time duration of $32 \times 10^6$ cycles of transmission after $t_o$). For purposes of illustration, let it be assumed that transmitter 20 moves a distance d toward receiver 21 in the time interval between the conditions illustrated in FIGS. 1A and 1B. Further, it shall be assumed that the initial conditions illustrated in FIG. 1A are such that there are ten cycles of transmitted signal between the transmitter 20 and each of receivers 21 and 22. (Hence, the distance between transmitter 20 and each of receivers 21 and 22 is 10λ.) Receivers 21 and 22 are at fixed positions and each includes a suitable counter for counting the number of cycles of signals received from transmitter 20. As heretofore stated, it shall be assumed that the initial count in receivers 21 and 22 are both set to 0.

As shown in FIG. 1B, transmitter 20 has moved a distance $d$ in a direction $x$ toward receiver 21. The condition is such that instead of there being 10 cycles of signal between transmitter 20 and receiver 21, the transmitter has moved to a position such that there are only nine cycles between transmitter 20 and receiver 21. Similarly, instead of ten cycles appearing between transmitter 20 and receiver 22, the transmitter has moved to a position such that there are now eleven cycles between transmitter 20 and receiver 22. Hence the distance between transmitter 20 and receiver 21 is 9λ and the distance between transmitter 20 and receiver 22 is 11 λ.

Had transmitter 20 remained stationery with respect to receivers 21 and 22 during the time duration between FIGS. 1A and 1B (while transmitter 20 transmitted $32 \times 10^6$ cycles), each would have received $32 \times 10^6$ cycles and hence advanced their counts by $32 \times 10^6$. However, since transmitter 20 has moved a distance $d$, which happens to equal one cycle, toward receiver 21, receiver 21 has advanced one extra cycle to a count of 32,000,001, and since the transmitter has moved away from receiver 22 by one cycle, receiver 22 received one less cycle to advance its count to 31,999,999. It will be therefore appreciated that the count difference (in this case, 2) reflects twice the number of wavelengths of movement of the vehicle, and that $$d = (C/2)\lambda,$$

where C is the count difference between receivers 21 and 22. Fron this example, therefore, it will be appreciated that the transmitter has moved one wavelength between the conditions illustrated in FIGS. 1A and 1B. Thus, by knowing the frequency of transmission, from which is derived λ, the differential change of position of transmitter 20 along the axis between receivers 21 and 22 may be determined.

It will be appreciated that the example set forth in FIGS. 1A and 1B is overly simplified for purposes of explanation. In this respect, it is highly unlikely that a vehicle will be traveling along an axis directly between two transmitters. It is further highly unlikely that the number of wavelengths between the transmitter and receiver will be as small as ten, as it is more likely that at ordinary frequencies the number of wavelengths will be extremely high. It can be shown, however, that when a vehicle moves in space with respect to a plurality of ground receivers, such vehicle will move relative to three linear axes, each established by a pair of receivers. By providing three receiver pairs to intersect the three axes, the differential position in space of the vehicle may be determined. "Differential position" as used herein, means the relative position of the vehicle with respect to a prior position.

(It will be appreciated that the vehicle location will always be on a hyperbolic surface whose axis is coincident with the axis established by each receiver pair. Thus, a family of hyperbolic surfaces are established having their foci at the receiver location. Surface intersection of the family of hyperbolas yield the vehicle position).

In FIG. 2, which is a plan view of a typical system for tracking a vehicle carrying transmitter 20, transmitter 20 is moving in some relationship in respect to receivers 21 22, 23, and 24. The direction of the vehicle carrying transmitter 20, need not be in a straight line, but instead may be any random path, and at continuously changing velocities and accelerations. The signal transmitted by transmitter 20 via its antenna is picked up by the antennas associated with the receivers 21–24 which in turn operate respective counters 25–28. By way of example, the frequency of transmission from transmitter 20 may be at 403 MHz. This signal is received by each receiver 21–24. Preferrably reference transmitter 29 transmits a different reference frequency, such as 402.9972 MHz, which is likewise received by each receiver 21–24. The physical location of receivers 21–24 and of reference transmitter 29 may be of any desirable configuration, each being fixed in relationship to the others. The signals received by the various receivers 21–24 form a difference frequency between the signals transmitted by transmitter 20 and 29. The difference frequency is utilized to update the respective counts in counters 25–28. It should be noted that if the frequency of transmission of both transmitters 20 and 29 are constant, the only alteration in the count will be due to vehicle movement. Counters 25–28 provide outputs to computer 20 for computing the differential position of the vehicle carrying transmitter 20.

Although the examples set forth in FIGS. 1 and 2 have been described in connection with the counting be each receiver of the number of cycles of transmitted signal, it will be appreciated to those skilled in the art that the signal frequencies actually received are shifted by a Doppler frequency. Thus, as a simplified example, if transmitter 20 were transmitting at a frequency of ten cycles per second, and in one second moves a distance d equivalent to the wavelength of one cycle, receiver 21 receives an effective frequency of 11 cycles per second whereas receiver 22 receives an effective frequency of only nine cycles per second. The one cycle per second change is, in effect, a Doppler shift frequency. With the foregoing in mind, reference may now be had to FIG. 3 which is a block diagram illustrating the apparatus of a typical receiver 40 which exemplifies receivers 21–24.

In a typical system, the vehicle tranmitter may be transmitting at a constant frequency of 403 MHz, whereas reference transmitter 29 might be transmitting at a constant frequency 2.8 KHz below the frequency of transmission of the reference transmitter. Hence, each receiver 40 will receive two signals, one at 403.000 MHz and the other at 402.9972 MHz. The signals from transmitters 20 and 29 are received by antenna 41 of receiver 40. Antenna 41, for example, may be a right hand circularly polarized antenna having a pattern gain at 0 dBiC at the horizon, plus .5 dBiC overhead, and minus 7 dBiC at 45° below the horizon. The signal from antenna 41 is forwarded via a suitable cable through a high-Q resonant circuit (not shown) to mixer 42. Automatic frequency control circuit 43 receives an input from filter 44 to control voltage controlled oscillator 45 to tune mixer 42 to a bandwidth between about 402.980 and 403.020 MHz.

The output of mixer 42 is forwarded to IF stage 46, which preferably contains a fixed reference oscillator to amplify and convert the signal to a signal in range of about 455 KHz. IF stage 46 forwards the converted signals to filters 44 and 47, filter 47 passing signals representative of the signals received from the moving transmitter 20, whereas reference filter 44 passes signals representative of reference transmitter 29. The signals from filters 44 and 47 are forwarded to a difference circuit 48 which provides an output signal representative of the frequency difference between the reference transmitter 29 and the mobile transmitter 20. This signal is multiplied by multiplier 49 and forwarded to counter 50. Counter 50 counts the number of cycles received from multiplier 49 to provide a count signal representative of the number of cycles of signal passed by difference circuit 48. This count, when forwarded to computer 30 and compared to the counts received from other receivers, will provide the basis of determining the relative change of position of the vehicle carrying transmitter 20.

Monitor 51 receives signals from filters 44 and 47 to provide suitable lock and monitor controls. Indicator 52 may be provided to supply suitable indication of receiver apparatus. For example, if the frequency difference between the reference and mobile transmitters is greater than a predetermined maximum or less than a predetermined minimum limit, monitor 51 may be operated to operate indicator 52.

As heretofore explained, as the count indicative of the number of cycles of signals received are processed by computer 30, which when properly programmed can compare the counts received from a plurality of receivers to determine differential position of transmitter 20 as it travels through space. It will be appreciated to those skilled in the art, that through the use of three respective non-redundant pairs of receivers, the position in space of transmitter 20 may be determined relative to some prior position. By "non-redundant", it is meant that proper analysis of respective pairs of receivers will result in unique data. It can be shown, for example, that four receivers such as that illustrated in FIG. 2, will provide three non-redundant pairs for determination of the location of the transmitter 20 along any of three axes.

It will be appreciated that although the frequency transmitted by transmitter 20 is a predetermined frequency (e.g. 403 MHz), the actual frequency received will be shifted from that frequency by a Doppler shift, the amount of which will depend upon the rate of shifting of position (velocity). However, the signal so received, as Doppler shifted from the original frequency, is utilized to determine the count provided by the respective receiver. Hence, the signal processed through filter 56 is the beat frequency signal of the reference transmitter 29 and the Doppler-shifted signal from transmitter 20, and the count provided by the respective receiver is representative of the number of cycles of such beat frequency.

If it is desired to determine rate of movement of the vehicle (velocity), the movement may be calculated from the differential position based on the count rates and the time difference between signals.

The present invention thus provides techniques for detecting and calculating differential position as well as movement in space of a moving vehicle moving along any erratic path and at any erratic speed. The apparatus is effective in operation and provides determination of the vehicle position to within a few feet or inches over a range of many miles.

This invention is not to be limited by the embodiment shown in the drawings and described in the description, which is given by way of example and not of limitation, but only in accordance with the scope of the appended claims.

What is claimed is:

1. Apparatus for determining the relative shift of position of a moving vehicle, comprising: transmitter means carried by said vehicle and moving therewith for transmitting a signal of predetermined cyclic frequency; a plurality of receiver means, each located at predetermined fixed locations with respect to each other, for receiving the signal transmitted by said transmitter means; a plurality of counter means, each connected to a respective one of said receiver means and responsive to the frequency of signals received by the respective one of said receiver means for continuously advancing a count representative of the number of cycles of signals received by the respective receiver means; and computer means connected to each of said counter means and responsive to the count contained in each counter means for determining the count difference between respective pairs of said counter means to determine the relative shift of position of said vehicle along an axis between the respective ones of each of said pairs of receiver means.

2. Apparatus according to claim 1 further including second transmitter means at a predetermined fixed position with respect to each of said receiver means for transmitting a second signal of predetermined frequency, the frequency of said second signal being different from the said firstnamed signal, each of said receiver means simultaneously receiving said second signal with the signal transmitted from said first-named transmitter means, said receiver means including difference means responsive to said signal received from said first-named transmitter means and to said second signal for providing a third signal having a frequency representative of the difference in frequency of the signal received from the first-named transmitter means and said second signal, said counter means being responsive to said difference means four counting the number of cycles of said third signal.

3. Apparatus according to claim 2 wherein there are at least four of said receiver means arranged in at least three respective pairs.

4. Apparatus according to claim 3 wherein said receiver means form at least three axes.

5. Apparatus according to claim 1 wherein there are at least four of said receiver means arranged in at least three respective pairs.

6. Apparatus according to claim 5 wherein said receiver means form at least three axes.

* * * * *